United States Patent
Finkhelstein

(10) Patent No.: US 10,931,978 B2
(45) Date of Patent: Feb. 23, 2021

(54) PRESENTATION OF MEDIA CONTENT IN AIRCRAFT

(71) Applicant: BOMBARDIER INC., Dorval (CA)

(72) Inventor: Thomas Finkhelstein, Montreal (CA)

(73) Assignee: BOMBARDIER INC., Dorval (CA)

( * ) Notice: Subject to any disclaimer, the term of this patent is extended or adjusted under 35 U.S.C. 154(b) by 52 days.

(21) Appl. No.: 16/357,167

(22) Filed: Mar. 18, 2019

(65) Prior Publication Data

US 2019/0289336 A1   Sep. 19, 2019

Related U.S. Application Data

(60) Provisional application No. 62/645,100, filed on Mar. 19, 2018, provisional application No. 62/724,954, filed on Aug. 30, 2018.

(51) Int. Cl.
*H04N 21/214* (2011.01)
*H04N 21/44* (2011.01)
(Continued)

(52) U.S. Cl.
CPC ... *H04N 21/2146* (2013.01); *B64D 11/00155* (2014.12); *H04N 21/4131* (2013.01); *H04N 21/41422* (2013.01); *H04N 21/44* (2013.01)

(58) Field of Classification Search
CPC ......... H04N 21/2146; H04N 21/41422; B64D 11/00155
See application file for complete search history.

(56) References Cited

U.S. PATENT DOCUMENTS

2005/0216938 A1   9/2005   Brady, Jr. et al.
2011/0314489 A1*  12/2011  Keen ............... G06Q 30/0241
                                                725/23
(Continued)

FOREIGN PATENT DOCUMENTS

WO    2017079608 A1   5/2017

OTHER PUBLICATIONS

Akl et al., "A New Wireless Architecture for In-Flight Entertainment Systems Inside Aircraft Cabin", International Journal on Advances in Networks and Services, IARIA, 2011, 4 (12), pp. 159-175.
(Continued)

*Primary Examiner* — Hsiungfei Peng
(74) *Attorney, Agent, or Firm* — Norton Rose Fulbright Canada LLP

(57) ABSTRACT

Systems and methods for presenting media content in an aircraft are provided. A first video display unit is communicatively coupled to a personal electronic device for obtaining therefrom a request to present the media content. A wireless access point is communicatively coupled to the first video display unit for receiving from the first video display unit a first command to query the personal electronic device for media presentation parameters, and the wireless access point is communicatively coupled to the personal electronic device for obtaining the media presentation parameters therefrom. A second video display unit is communicatively coupled to the first video display unit via the wireless access point. The wireless access point is configured for issuing a second command to at least one of the first and second video display units to cause the media content to be presented according to the media presentation parameters.

16 Claims, 6 Drawing Sheets

(51) Int. Cl.
*B64D 11/00* (2006.01)
*H04N 21/414* (2011.01)
*H04N 21/41* (2011.01)

(56) References Cited

U.S. PATENT DOCUMENTS

| | | | |
|---|---|---|---|
| 2012/0174165 A1* | 7/2012 | Mondragon | H04N 21/4781 |
| | | | 725/75 |
| 2015/0017915 A1* | 1/2015 | Hennequin | H04B 7/18506 |
| | | | 455/41.2 |
| 2015/0245078 A1 | 8/2015 | Couleaud et al. | |
| 2017/0182957 A1 | 6/2017 | Watson et al. | |
| 2018/0101225 A1* | 4/2018 | Azmy | B60K 35/00 |

OTHER PUBLICATIONS

Arkl et al., A New Wireless Architecture for In-Flight Entertainment Systems Inside Aircraft Cabin, https://hal.archives-ouvertes.fr/hal-00661029_Submitted Jan. 18, 2012.

EP Search Report issued in parent EP Application No. 19163864. 2—References cited by the EPO Searching Authority.

* cited by examiner

PRESENTATION OF MEDIA CONTENT IN AIRCRAFT

CROSS-REFERENCE TO RELATED APPLICATIONS

The present application claims priority under 35 USC 119(e) of Provisional Patent Application bearing Ser. No. 62/645,100 filed on Mar. 19, 2018, and of Provisional Patent Application bearing Ser. No. 62/724,954 file on Aug. 30, 2018, the contents of which are hereby incorporated by reference.

TECHNICAL FIELD

The present disclosure relates generally to in-flight entertainment systems for aircraft, and more specifically to the presentation of media content within an aircraft.

BACKGROUND

Modern aircraft offer expansive in-flight entertainment (IFE) options: from radio stations to movies, games, and even in-flight wireless internet access, passengers can choose from a wide variety of sources for IFE during air transit. Traditional designs for IFE provide one or more screens through which video-based media content can be displayed, and audio aspects of IFE, whether tied to the video-based media content or separate therefrom, can be provided via speakers, headphone connectors, or other approaches. In many cases, passengers have a certain amount of control over what type of IFE they are presented, and can have access to a control panel or remote control device in order to alter the IFE source and content.

However, recent changes in the technology used to provide entertainment have dramatically outpaced changes in the field of aircraft electronics. In recent years, standard-definition media has been replaced first with high-definition media, and later with 4K-media; moreover, new, more exacting video standards are already being considered. In contrast, aircraft owners and operators expect their onboard electronic systems to last years, if not decades, and the time required to design and certify new aircraft electronics systems can be lengthy and expensive. Aircraft owners and operators are thus left to weigh consumer desires for the latest entertainment technology against the cost to retrofit existing aircraft.

As such, there is room for improved techniques for presenting media as part of IFE.

SUMMARY

In accordance with a broad aspect, there is provided a system for presenting media content in an aircraft, comprising: a video display unit communicatively coupled to a personal electronic device for receiving therefrom a request to present the media content; and a wireless access point communicatively coupled to the video display unit for providing the video display unit with the request and for receiving from the video display unit a first command to query the personal electronic device for media presentation parameters, wherein the wireless access point is communicatively coupled to the personal electronic device for receiving therefrom the media presentation parameters; wherein the wireless access point is configured for issuing a second command to at least one of the video display unit and a cabin management system to cause the media content to be presented according to the media presentation parameters.

In some embodiments, the video display unit is one of a plurality of video display units, the media presentation parameters comprise an indication of a selected video display unit of the plurality of video display units, and the wireless access point is configured for issuing the second command to the selected video display unit to cause the selected video display unit to present the media content.

In some embodiments, the aircraft comprises at least one sound system controlled by the cabin management system, and the wireless access point is configured for issuing the second command to the cabin management system to cause the at least one sound system to present the media content.

In some embodiments, the at least one sound system comprises a plurality of speakers, the media presentation parameters comprise an indication of a selected group of the plurality of speakers, and the second command causes the selected group of the plurality of speakers to present the media content.

In some embodiments, the media content is stored on a remote server accessible via the wireless access point, and the video display unit is configured for requesting the media content from the remote server via the wireless access point.

In some embodiments, the video display unit is configured for issuing the first command to the wireless access point responsive to the video display unit receiving the request.

In accordance with another broad aspect, there is provided a method for presenting media content in an aircraft, comprising: receiving, at a wireless access point, a first command to query the personal electronic device for media presentation parameters, the first command received from a video display unit and issued in response to the video display unit receiving a request to present the media content; receiving, at the wireless access point and from the personal electronic device, the media presentation parameters; and issuing at least one second command from the wireless access point to at least one of the video display unit and a cabin management system to cause the media content to be presented according to the media presentation parameters.

In accordance with a further broad aspect, there is provided a system for presenting media content in an aircraft, comprising: a first video display unit configured for presenting the media content and communicatively coupled to a media source with access to the media content and to a personal electronic device for obtaining therefrom a request to present the media content; a wireless access point communicatively coupled to the first video display unit for providing the first video display unit with the request and for receiving from the first video display unit a first command to query the personal electronic device for media presentation parameters, wherein the wireless access point is communicatively coupled to the personal electronic device for obtaining the media presentation parameters therefrom; and a second video display unit configured for presenting the media content and communicatively coupled to the first video display unit via the wireless access point; wherein the wireless access point is configured for issuing a second command to at least one of the first video display unit and the second video display unit a cabin management system to cause the media content to be presented via the at least one of the first video display unit and the second video display unit according to the media presentation parameters.

In some embodiments, the second video display unit is one of a plurality of second video display units, the media presentation parameters comprise an indication of a selected second video display unit of the plurality of second video display units, and the wireless access point is configured for issuing the second command to the selected second video display unit to cause the selected second video display unit to present the media content.

In some embodiments, the aircraft comprises a sound system controlled by a cabin management system of the aircraft, and the wireless access point is configured for issuing the second command to the cabin management system to cause the sound system to render the media content.

In some embodiments, the sound system comprises a plurality of speakers, the media presentation parameters comprise an indication of a selected group of the plurality of speakers, and the wireless access point is configured for issuing the second command to the selected group of the plurality of speakers to cause the selected group of the plurality of speakers to render the media content.

In some embodiments, the media source is a remote server communicatively coupled to the first video display unit via the wireless access point, and the first video display unit is configured for requesting the media content from the remote server via the wireless access point.

In some embodiments, the second video display unit is configured for presenting the media content responsive to the first video display unit requesting the media content from the remote server.

In some embodiments, the media source is located within the aircraft and the first video display unit being coupled to the media source comprises the media source being connected to a port of the first video display unit.

In some embodiments, causing the media content to be presented via the second video display unit comprises transmitting the media content from the first video display unit to the second video display unit via the wireless access point.

In some embodiments, the first video display unit is configured for issuing the first command to the wireless access point responsive to the first video display unit receiving the request.

In some embodiments, the aircraft comprises a lighting system controlled by a cabin management system of the aircraft, and the wireless access point is configured for issuing the second command to the cabin management system to cause the lighting system to adjust a lighting level within the aircraft.

In accordance with a still further aspect, there is provided a method for presenting media content in an aircraft, comprising: obtaining, at a wireless access point within the aircraft, a first command to query a personal electronic device for media presentation parameters, the first command obtained from a first video display unit configured for presenting the media content and coupled to a media source with access to the media content, the first command issued in response to the first video display unit receiving a request to present the media content; obtaining, at the wireless access point and from the personal electronic device, the media presentation parameters; and issuing a second command from the wireless access point to at least one of the first video display unit and a second video display unit to cause the media content to be presented via the at least one of the first video display unit and the second video display unit according to the media presentation parameters.

In some embodiments, the second video display unit is one of a plurality of second video display units, the media presentation parameters comprise an indication of a selected second video display unit of the plurality of second video display units, and the second command is issued to the selected second video display unit to cause the selected second video display unit to present the media content.

In some embodiments, issuing the second command comprises issuing the second command to a cabin management system of the aircraft to cause a sound system controlled by the cabin management system to render the media content.

In some embodiments, the media presentation parameters comprise an indication of a selected group of a plurality of speakers of the sound system, and issuing the second command to the cabin management system comprises causing the selected group of the plurality of speakers to render the media content.

In some embodiments, the method further comprises, responsive to the second command being issued to the first video display unit, requesting, via the wireless access point, the media content from a remote server.

In some embodiments, the method further comprises transmitting the media content to the second video display unit for presenting the media content.

In some embodiments, issuing the second command comprises causing the first video display unit to obtain the media content from the media source, which is located within the aircraft and connected to a port of the first video display unit.

In some embodiments, causing the media content to be presented via the second video display unit comprises causing the first video display unit to transmit the media content from the first video display unit to the second video display unit via the wireless access point.

In some embodiments, the first video display unit is configured for issuing the first command to the wireless access point responsive to the first video display unit receiving the request.

In some embodiments, the method further comprises issuing the second command to a cabin management system of the aircraft to cause a lighting system of the aircraft to adjust a lighting level within the aircraft.

In accordance with a further aspect, there is provided a system for presenting media content in an aircraft, comprising: a communication backbone for the aircraft configured for transmitting instructions for controlling operation of control systems of a cabin of the aircraft; a video display unit configured for presenting the media content and communicatively coupled to a media source with access to the media content; and a wireless access point communicatively coupled to the backbone, to the video display unit, and to a personal electronic device, the wireless access point configured for: issuing a first command to the video display unit to present the media content, wherein the media content is provided to the video display unit from the media source independently of the backbone, the first command being issued in response to receipt of media presentation parameters from the personal electronic device; and issuing a second command via the backbone to at least one of the control systems to adjust a cabin parameter of the aircraft cabin.

In some embodiments, the video display unit is one of a first video display unit and a second video display unit configured for presenting the media content and communicatively coupled to the media source via the wireless access point, and the first command is issued to at least one of the first video display unit and the second video display unit.

In some embodiments, the second video display unit is one of a plurality of second video display units, the media presentation parameters comprise an indication of a selected second video display unit of the plurality of second video display units, and the wireless access point is configured for issuing the first command to the selected second video display unit to cause the selected second video display unit to present the media content.

In some embodiments, issuing the second command via the backbone is performed in response to receipt of the media presentation parameters, and the media presentation parameters comprise an identification of cabin parameter adjustments.

In some embodiments, adjusting a cabin parameter of the aircraft cabin comprises causing a sound system of the aircraft to render a portion of the media content, based on the media presentation parameters.

In some embodiments, the sound system comprises a plurality of speakers, the media presentation parameters comprise an indication of a selected group of the plurality of speakers, and issuing the second command comprises causing the selected group of the plurality of speakers to render the portion of the media content.

In some embodiments, adjusting a cabin parameter of the aircraft cabin comprises causing a lighting system to adjust a lighting level within the aircraft, based on the media presentation parameters.

In some embodiments, issuing the second command via the backbone is performed based on predetermined parameters for the at least one of the control systems, and the predetermined parameters are associated with the media presentation parameters.

In some embodiments, adjusting a cabin parameter of the aircraft cabin comprises causing a sound system of the aircraft to render a portion of the media content, based on the predetermined parameters.

In some embodiments, the sound system comprises a plurality of speakers, the predetermined parameters comprise an indication of a predetermined group of the plurality of speakers, and issuing the second command comprises causing the predetermined group of the plurality of speakers to render the portion of the media content.

In some embodiments, adjusting a cabin parameter of the aircraft cabin comprises causing a lighting system to adjust a lighting level within a predetermined zone of the aircraft, based on the predetermined parameters.

In some embodiments, the media source is a remote server communicatively coupled to the video display unit via the wireless access point, and the video display unit is configured for requesting the media content from the remote server via the wireless access point.

In some embodiments, the media source is located within the aircraft and the video display unit being coupled to the media source comprises the media source being connected to a port of the video display unit.

In some embodiments, the video display unit is a first video display unit, further comprising a second video display unit configured for presenting the media content, and the first command is issued to the first video display unit to cause the media content to be presented by the second video display unit, comprising transmitting the media content from the first video display unit to the second video display unit via the wireless access point.

In some embodiments, the video display unit is configured for issuing a request to the wireless access point to obtain the media presentation parameters from the personal electronic device.

In accordance with a still further aspect, there is provided a method for presenting media content in an aircraft, comprising: receiving, at a wireless access point and from a personal electronic device, media presentation parameters; issuing, in response to receipt of the media presentation parameters, a first command to a video display unit to present the media content, the video display unit communicatively coupled to a media source with access to the media content via the wireless access point, wherein the media content is provided to the video display unit from the media source independently of a communication backbone for the aircraft, the backbone configured for transmitting instructions for controlling operation of control systems of a cabin of the aircraft; and issuing a second command via the backbone to at least one of the control systems to adjust a cabin parameter of the aircraft cabin.

In some embodiments, the video display unit is one of a first video display unit and a second video display unit configured for presenting the media content and communicatively coupled to the media source via the wireless access point, the first command is issued to at least one of the first video display unit and a second video display unit.

In some embodiments, the second video display unit is one of a plurality of second video display units, the media presentation parameters comprise an indication of a selected second video display unit of the plurality of second video display units, and the first command is issued to the selected second video display unit to cause the selected second video display unit to present the media content.

In some embodiments, issuing the second command via the back bone is performed in response to receipt of the media presentation parameters, the media presentation parameters comprising an identification of cabin parameter adjustments.

In some embodiments, adjusting a cabin parameter of the aircraft cabin comprises causing a sound system of the aircraft to render a portion of the media content, based on the media presentation parameters.

In some embodiments, the media presentation parameters comprise an indication of a selected group of a plurality of speakers of the sound system, and issuing the second command via the backbone comprises causing the selected group of the plurality of speakers to render the portion of the media content.

In some embodiments, adjusting a cabin parameter of the aircraft cabin comprises causing a lighting system to adjust a lighting level within the aircraft, based on the media presentation parameters.

In some embodiments, issuing the second command via the backbone is performed based on predetermined parameters for the at least one of the control systems, the predetermined parameters being associated with the media presentation parameters.

In some embodiments, adjusting a cabin parameter of the aircraft cabin comprises causing a sound system of the aircraft to render a portion of the media content, based on the predetermined parameters.

In some embodiments, the media presentation parameters comprise an indication of a selected group of a plurality of speakers of the sound system, and issuing the second command comprises causing the predetermined group of the plurality of speakers to render the portion of the media content.

In some embodiments, adjusting a cabin parameter of the aircraft cabin comprises causing a lighting system to adjust a lighting level within a predetermined zone of the aircraft, based on the predetermined parameters.

In some embodiments, the method further comprises, responsive to the first command being issued to the video display unit, requesting, via the wireless access point, the media content from a remote server.

In some embodiments, issuing the first command comprises causing the video display unit to obtain the media content from the media source, and the media source is located within the aircraft and connected to a port of the first video display unit.

In some embodiments, the video display unit is a first video display unit, the first command is issued to the first video display unit to cause the media content to be presented by a second video display unit, and the method further comprises causing the first video display unit to transmit the media content from the first video display unit to the second video display unit via the wireless access point.

In some embodiments, the video display unit is configured for issuing a request to the wireless access point to obtain the media presentation parameters from the personal electronic device.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Figure 1:
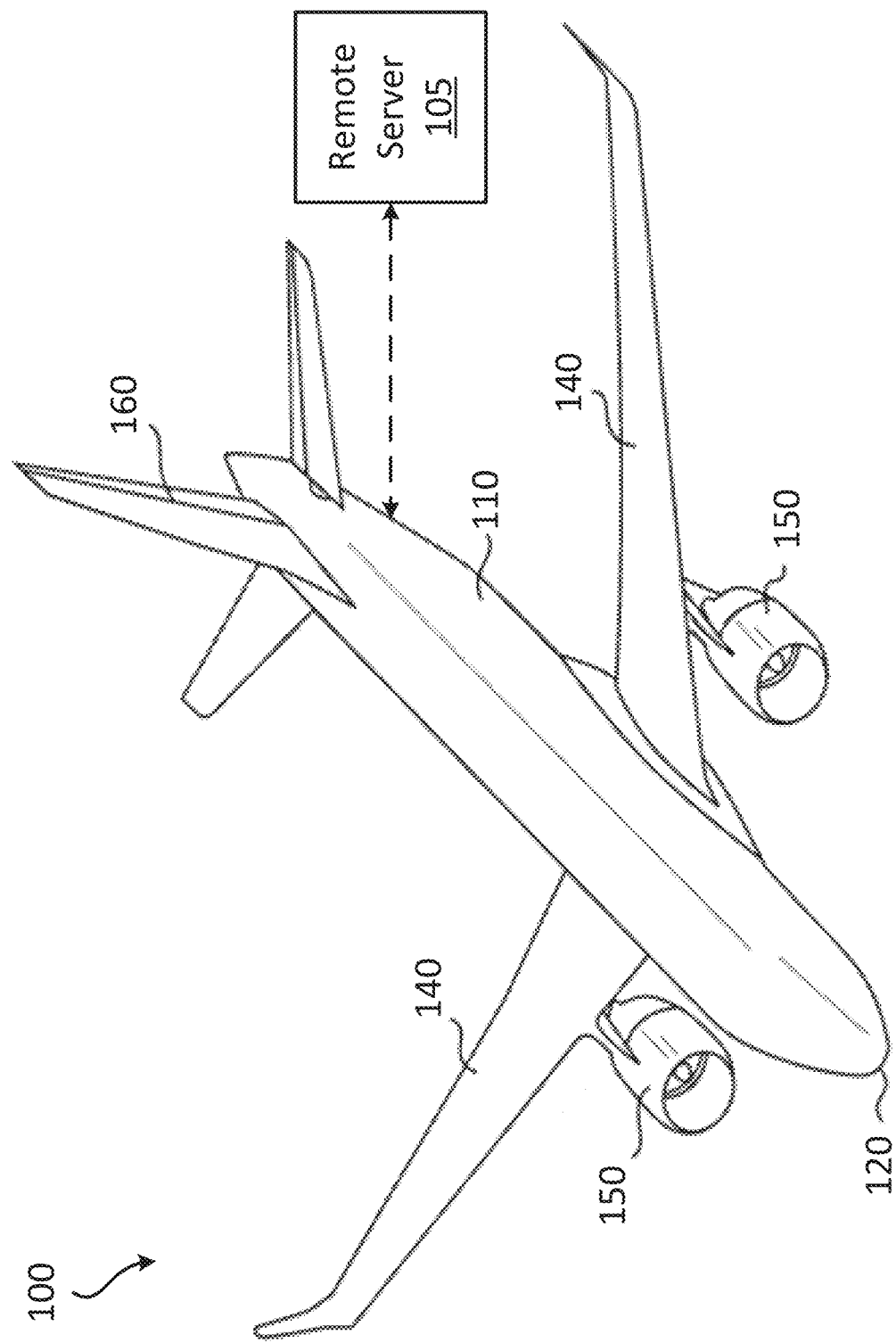
FIG. 1 is a diagram of an example aircraft.

With reference to FIG. 1, an aircraft 100 is illustrated, having a fuselage 110, a pair of wings 140 (or more), engines 150, and a tail 160. Aircraft 100 may be any suitable aircraft such as corporate, private, commercial, or any other type of aircraft. For example, aircraft 100 may be a narrow-body, twin engine jet airliner. Aircraft 100 may be a fixed wing or a rotary wing aircraft. The fuselage 110 has a cockpit 120, which can be positioned at any suitable location on the aircraft 100, for example at a front portion of the fuselage 110. The cockpit 120 is configured for accommodating one or more pilots who control the aircraft 100 by way of one or more operator controls. The operator controls can include any suitable number of pedals, yokes, steering wheels, centre sticks, flight sticks, levers, knobs, switches, and the like. Although two engines 150 are illustrated, it should be understood that the aircraft 100 can have any suitable number of engines. The aircraft 100 is also configured for communicating with a remote server 105, as is detailed hereinbelow.

Figure 2:
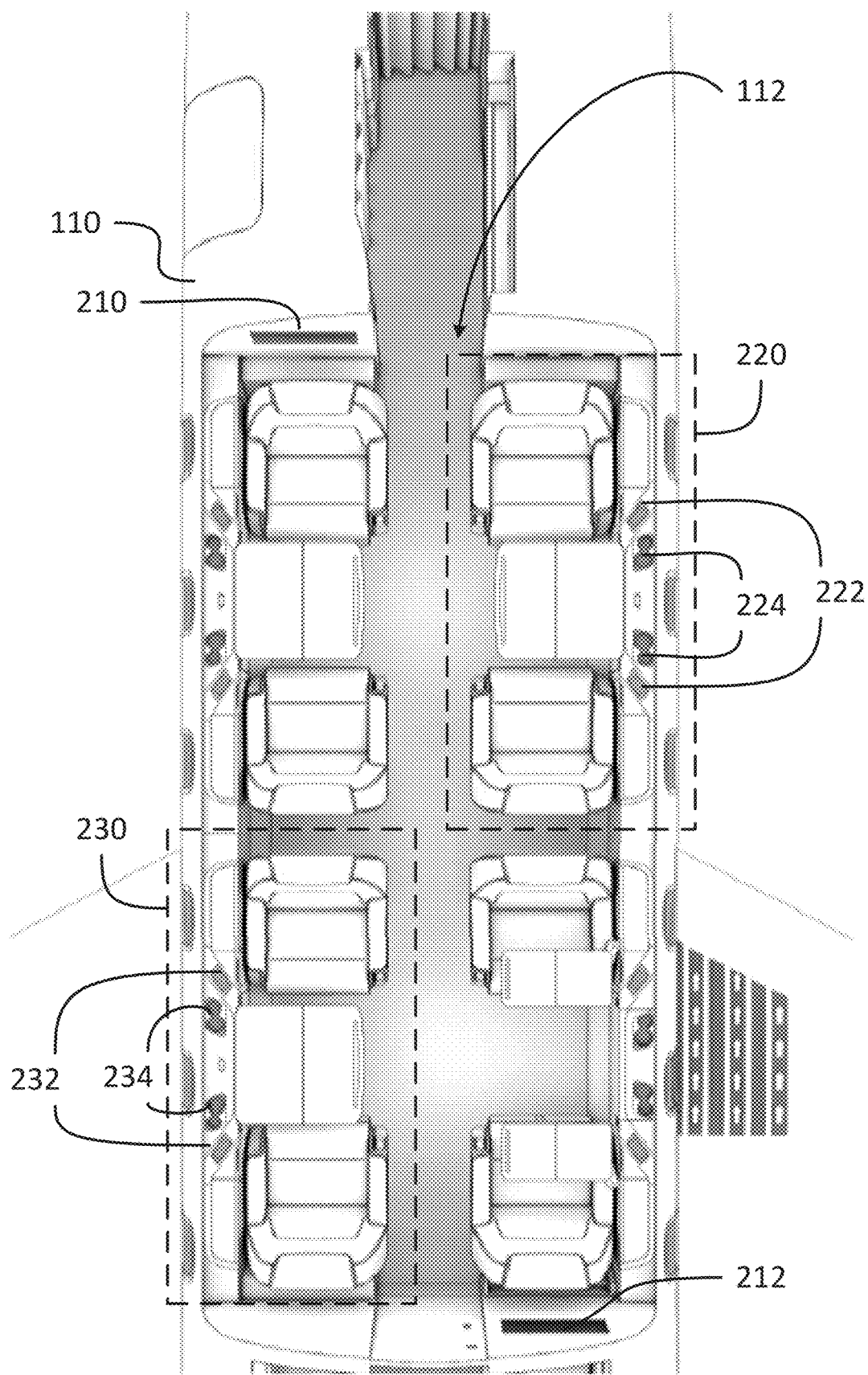
FIG. 2 is a diagram of an overhead cutaway view of a cabin of the example aircraft of FIG. 1.

With reference to FIG. 2, the fuselage 110 of the aircraft can house a cabin 112 for receiving passengers. Various electronic systems are housed in the cabin 112 as well as elsewhere in the aircraft 100, and a cabin management system can be provided to control various aspects of the environment in cabin 112, including lighting, ventilation, and the like, via various control systems. The cabin management system can be accessible via hardware and/or software interfaces. For example, a plurality of buttons can be installed on a control panel on a wall or side ledge of the cabin 112 to interface with the cabin management system. An application on a personal electronic device, for instance a smartphone, can also be used to interface with the cabin management system.

The electronic systems can include various systems for providing in-flight entertainment (IFE). For example, the cabin 112 contains fore and aft display screens 210, 212, individual display screens 222, 232, individual sound systems 224, 234, and the like. The screens 222, 232, can be any suitable type of screen, and the sound systems 224, 234 can incorporate any suitable number of speakers, headphone connection ports, bone-conduction sound devices, and the like, which can be configured for performing playback of media content. Additionally, in some embodiments the cabin 112 is divided into a plurality of entertainment zones, for instance the zones 220 and 230. Each of the screens 210, 212, 222, 232 and the sound systems 224, 234 can be associated to a particular zone. In the embodiment of FIG. 2, screens 222 and sound system 224 are part of zone 220, and screens 232 and sound system 234 are part of zone 230.

In some existing systems, the cabin management system is also responsible for controlling the operation of the display screens 210, 212, 222, 232, and the sound systems 224, 234, and for distributing media content (video, audio) through the cabin management system to selected ones of the display screens 210, 212, 222, 232. Due to the lengthy timelines required to design and certify aircraft electronics, including the cabin management system, the electronics onboard production-ready aircraft are often already out-of-date with respect to the advances in consumer-grade electronics when production begins. For example, by the time an aircraft designed to accommodate HD video (1080p) is ready for production, a higher-definition video standard, for example 4K video, can already have been adopted. However, specifications of the cabin management may preclude adopting 4K video due to processing power, bandwidth, or other limitations of the cabin management system. When video content is distributed through the cabin management system infrastructure, it can be insufficient to replace screens and cables in the cabin 112 and instead require a complete retrofit of the cabin management system in order to provide the capacity to show 4K video on the screens 210, 212, 222, 232. This can be costly and disruptive.

Figure 3A:
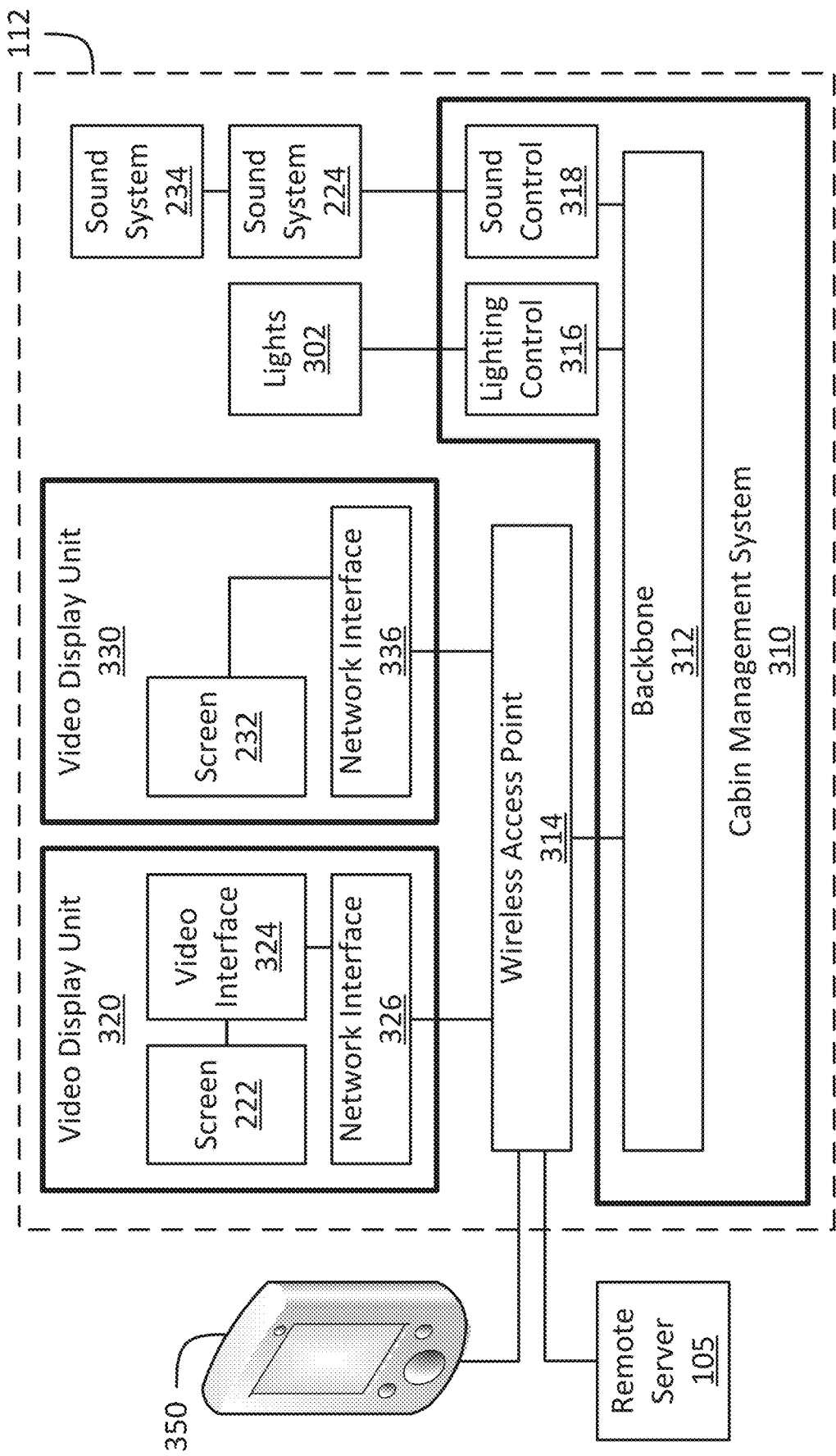
FIGS. 3A-B are block diagrams of example implementations of a cabin management system and a video display unit for the cabin of FIG. 2.

With reference to FIG. 3A, an alternative to existing systems for presenting media content in an aircraft is provided. In accordance with embodiments of the present disclosure, the cabin 112 is provided with a cabin management system 310, a wireless access point 314, and one or more video display units; in FIG. 3A, two video display units 320, 330 are illustrated, though it should be understood that the cabin 112 can be provided with any suitable number of video display units. The video display units 320, 330 are modular with respect to the cabin management system 300. Put differently, the video display units 320, 330 are substantially separate from the cabin management system 310, and the video display units 320, 330 are replaceable and/or removable separately from the cabin management system 310. Both the cabin management system 310 and the video display units 320, 330 are controllable via a personal electronic device 350, for example via the wireless access point 314. The personal electronic device 350 can be a smartphone, a featurephone, a tablet, a personal digital assistant, a laptop computer, or any other suitable portable electronic device. The personal electronic device 350 interfaces with the cabin management system 310 and the video display units 320, 330 via one or more wireless communication protocols, including Wi-Fi (802.11a/b/g/n/ac or similar protocols), Bluetooth®, Zigbee®, and the like.

The cabin 112 can also be equipped with various other elements, for example lights 302, one or more sounds systems, for example the sound systems 224, 234, a galley, a lavatory, a ventilation system, and the like, some or all of which can be controlled via the cabin management system 310 via associated control systems. Put differently, the cabin management system 310 can cause instructions to be transmitted via the backbone to the control systems, for instance when instructions are received from the wireless access point 314. These instructions can, for example, cause the control systems to adjust a cabin parameter, for instance a lighting level, a heating or cooling level, a power consumption level, and the like, as described in greater detail hereinbelow.

In the embodiment of FIG. 3A, the cabin management system 310 is composed of a communication backbone 312 and two control systems, namely a lighting control 316 and a sound control 318. The lighting control 316 is configured for controlling operation of the lights 302, and the sound control 318 is configured for controlling operation of the sound systems 224, 234. In embodiments where the cabin management system 310 also controls operation of additional elements, for instance the galley, the lavatory, and/or the ventilation system, additional control systems can form part of the cabin management system 310. For instance, a ventilation control system can be provided in the cabin management system 310 to control operation of a HVAC (heating, ventilation, and air conditioning) system in the cabin 112. It is also considered to provide the cabin management system 310 with other control systems, as appropriate. The cabin management system 310 can interface with the lights 302, the sound systems 224, 234, and any other elements via any suitable wired or wireless communication interface, for example the backbone 312.

The backbone 312 of the cabin management system 310 serves to relay information between the various control systems of the cabin management system 310. When instructions to alter conditions within the cabin are obtained at the cabin management system 310, for example via the wireless access point 314, the backbone 312 ensures that the instructions are provided to the appropriate control system. For example, if the wireless access point 314 obtains a command to adjust the brightness of lights 302, the command can be routed to the lighting control 316 via the backbone 312. The backbone 312 can be implemented as a bus, local area network, or other network architecture, for example using Ethernet or another similar technology.

The wireless access point 314 is configured for receiving and transmitting instructions between the personal electronic device 350, the backbone 312, and the video display units 320, 330 using W-Fi, Bluetooth®, Zigbee®, or any other suitable wireless protocol. In some embodiments, the wireless access point 314 acts as an internet router and establishes a W-Fi network over which the personal electronic device 350, the backbone 312, and the video display units 320, 330 can communicate with the wireless access point 314.

In addition, the wireless access point 314 can access the remote server 105. In some embodiments, the remote server 105 is a media server which stores various media content and which can serve the media content to the wireless access point 314, for example for presentation via the video display units 320, 330 and/or the sound systems 224, 234. In some instances, the remote server 105 is configured for providing streaming media, and thus maintains a substantially continuous connection with the wireless access point 314. In other instances, the remote server 105 is a repository of media content which is configured to permit downloading of media content via the wireless access point 314. In some other embodiments, the remote server 105 is a processing server which obtains information about the aircraft 100 via the wireless access point 314, and which can process the information to produce a "live map" media content for presentation via the video display units 320, 330 and/or the sound systems 224, 234. For example, the remote server 105 can obtain various telemetry data from the aircraft 100, including altitude, speed, heading, location, and the like, and can use the telemetry data to produce a live map content for display via the video display units 320, 330, which is a graphical representation of the flight mission being performed by the aircraft 100. In some instances, the live map can be updated in real-time, and thus the wireless access point 314 is configured for exchanging telemetry data with the remote server 105 substantially in real-time. It should be noted that other approaches for generating the live map, for instance via the personal electronic device 350, are also considered. For example, the personal electronic device 350 can be provided with an application which obtains telemetry data from the aircraft 100 and uses the telemetry data to produce a media content to be displayed on the video display units 320, 330.

Each of the video display units 320, 330 is composed of a screen, for example the individual display screens 222, 232, and a network interface 326, 336. In some embodiments, a video display unit, for example the video display unit 320, also includes a video interface 324. With specific regard to the video display unit 320, the screen 222 can be any suitable device for displaying visual content, for example a television, a monitor, a tablet, a projector, a virtual reality headset, and the like, and can use any suitable display technology, including CRT, LCD, plasma, LED, OLED, and the like. The screen 222 is communicatively coupled to the video interface 324, which provides the screen 222 with video data for causing the screen 222 to display the media content. For example, the screen 222 and the video interface 324 can communicate via HDMI®, DisplayPort®, DVI®, VGA®, Thunderbolt®, USB®, S-Video, RS-232, or any other suitable protocol. The video interface 324 can obtain the video data, or an encoded version of the video data, from the network interface 326, or from a source of local media content connected to the video interface 324, for example a media disk player, a game console, and the like. In some embodiments, the video interface 324 is configured for decoding the video data and for providing decoded video data to the screen 222.

The network interface 326 is configured for receiving video data to be presented via the screen 222 from the wireless access point 314. For example, the wireless access point 314 and the network interface 326 can communicate wirelessly using Bluetooth®, Zigbee®, or any other suitable wireless protocol, and the wireless access point 314 can transmit video data obtained, for example, from the remote server 105 to the network interface 326 for presentation via the screen 222. The network interface 326 is also configured for receiving and transmitting instructions between the video interface 324 and the wireless access point 314, which can be obtained via the personal electronic device 350. For example the network interface 326 can be connected to the Wi-Fi network established by the wireless access point 314, and can be coupled to the personal electronic device 350 via the Wi-Fi network. In some embodiments, the network interface 326 is additionally configured for transmitting video data to the wireless access point 314, for example video data obtained from the video interface 324, for distribution to other elements of the cabin 112, for instance the video display unit 330.

In some embodiments, the operation of the video display unit 330 is substantially similar to that of the video display unit 320. In other embodiments, for instance the embodiment illustrated in FIG. 3A, the video display unit 330 does not include a video interface; decoding of video data obtained at the network interface 336, for example from the wireless access point 314, can be decoded at the network interface 336 and/or at the screen 232 itself. In other embodiments, the video data obtained at the network interface 336 can already be decoded, for example as a set of display instructions for the screen 232. The video display unit 330 can be configured for receiving media content to display via the screen 232 from a variety of sources, for example from the video display unit 320 via the wireless access point 314. For example, video data can be sent to the video display unit 320 to be decoded by the video interface 324. Then, the decoded video data can be sent to the wireless access point 314 via the network interface 326, and the wireless access point 314 can forward the decoded video data to the video display unit 330, via the network interface 336, for display on the screen 232.

In some embodiments, the video data can be redistributed in this fashion via the wireless access point 314 to cause a common media content to be presented on multiple screens, for example the screen 222 and the screen 232. For example, the video display unit 320 can obtain video data to be displayed and then create a copy of the video data for transmission to the video display unit 330 via the wireless access point 314. The video display unit 320 can then present the video data via screen 222, and the video display unit 330 can present the video data via screen 232.

In some embodiments, one or more elements of the video display units 320, 330 can be physically integrated, such that a video display unit can be a single device which incorporates a screen, video interface, and network interface. For example, the video display unit 320 can be embodied as a television which has integrated therein wireless streaming capability. In this example, the wireless streaming capability integrated into the television implements the video interface and the network interface. In other embodiments, the elements of the video display 320 are separate: the screen 222 is connected to a video interface 324, for example a port for an HDMI® cable or similar interface, via which a wireless streaming device, for example a Chromecast® or AppleTV® device, can be coupled. In other embodiments, other sources of local media content, for example media disk players, game consoles, and the like, can be connected with the video interface 324 and presented via the screen 222 and/or redistributed to the video display unit 330 via the wireless access point 314.

In accordance with one embodiment, presentation of a predetermined media content on one or more of the video display units 320 can be effected. The network interface 326 obtains a request from the personal electronic device 350 to present the predetermined media content. The request from the personal electronic device 350 to the network interface 326 can be obtained via the wireless access point 314. For example, the personal electronic device 350 can send the request to display a particular streaming media content from an application associated with the provider of the streaming media content. The request can specify an identifier of the media content, a location (e.g., URL) of the media content, a set of credentials for authenticating access to the media content, and the like. Upon receipt of the request, the network interface 326 can transmit a first command to the wireless access point 314 to request that the wireless access point 314 query the personal electronic device 350 for media presentation parameters.

The first command is obtained by the wireless access point 314, which then queries the personal electronic device 350 for media presentation parameters. For example, the wireless access point 314 can cause a particular application to be activated on the personal electronic device 350, through which a user of the personal electronic device 350 can specify the media presentation parameters. The media presentation parameters can include: a selection of one or more video display units on which to display media content, confirmation of one or more video display units on which to display media content, confirmation of the media content to be displayed, a selection of one or more sound systems via which to present audio aspects of the media content, etc. In some embodiments, the application for entry of the media presentation parameters can employ machine learning techniques for suggesting certain media display parameters to the user upon activation of the application. For instance, depending on a time of day, a location of the user within the aircraft 100, an identity of the user and/or of the personal electronic device 350, and the like, the application for entry of the media presentation parameters can suggest different default media display parameters. Other embodiments are also considered.

The wireless access point 314 can then receive the media presentation parameters from the personal electronic device 350. In addition to media presentation parameters surrounding the video display unit and the media content desired, the media presentation parameters can include an indication of which of the sound systems 224, 234 should be used for presentation of the audio portions of the media content, whether the lights 302 should be dimmed during presentation, whether shutters of windows in the cabin 312 should be closed via associated motors or actuators, a selection of presentation language and/or subtitles, and the like.

In some embodiments, the cabin 112 can be provided with a plurality of video display units, as shown in the example of FIG. 3A. In some such embodiments, the media presentation parameters provided by the personal electronic device 350 to the wireless access point 314 include an indication of a selected video display unit, or of a selected screen, via which the media content is to be presented. For example, the media presentation parameters can specify that the media content is to be presented on screen 222 of video display unit 320. Additionally, the media presentation parameters can specify any other suitable information for display of the media content, for instance an indication of which of the sound systems 224, 234 should render an audio portion of the media content, how lights 302 should be adjusted, how power settings for the galley, ventilation system, etc., should be altered, and the like. For instance, ventilation systems which produce noise in the vicinity of screen 222 can be adjusted to operate at a lower setting, and blinds of windows near screen 222 can be shuttered. In other words, the media presentation parameters can comprise any suitable indication of requested cabin parameters adjustments. The media presentation parameters can be provided in any suitable format and using any suitable data structure.

In another example, and with additional reference to FIG. 2, the media presentation parameters can specify a zone in which the media content is to be presented, which can be interpreted, for example by the wireless access point 314, as specifying a particular one of the video display units 320, 330. Once the media presentation parameters are received from the personal electronic device 350, the wireless access point 314 can issue one or more second commands to the network interface 326 and/or the backbone 312 to cause the media content to be presented in accordance with the media presentation parameters specified by the personal electronic device 350.

For example, if the media presentation parameters specify a particular zone, then the wireless access point 314 can issue separate second commands to the sound system, via the backbone 312, and the video display unit associated with the particular zone. In another example, the media presentation parameters specify that the lights 302 in the cabin 112, or in a portion of the cabin 112, are to be dimmed, and the wireless access point 314 can issue second commands to the lighting control 316 through the backbone 312. Still other examples are considered.

In some other embodiments, the media presentation parameters do not specify a zone in which the media content should be presented: for instance, the media presentation parameters can indicate substantially only a particular one of the video display units 320, 330 on which the media content should be presented, or a media content to be presented. In some such instances, the personal electronic device 350, the wireless access point 314, and/or the selected one of the video display units 320, 330, can be provided with certain default or predetermined parameters, which can be employed along with or as a substitute for the media presentation parameters, as appropriate. In some cases, the predetermined parameters can be associated with, or based on, the media presentation parameters obtained from the personal electronic device 350. For example, if the media presentation parameters indicate that the media content should be presented on the video display unit 320, the predetermined parameters associated with the video display unit 320 can specify a particular set of speakers through which a sound portion of the media content, for example an audio track, should be rendered, a particular subset of the lighting in the cabin 112 which should be dimmed, a particular subset of shutters in windows of the cabin 112 which should be closed, and the like. In another example, if the if the media presentation parameters indicate only which media content should be presented, predetermined parameters based on the identity of the user of the personal electronic device can specify which of the video display units 320, 330, should present the media content, as well as any other suitable information for presenting the media content. In some embodiments, predetermined parameters can be provided for each of the video display units 320, 330; in other embodiments, the choice of one or more predetermined parameters can be based on a time of day, a location of the aircraft 100, an identity of the user of the personal electronic device 350, or any other suitable information.

By providing two-way communication between personal electronic device 350 and the wireless access point 314, and between the network interface 326 and the wireless access point 314, presentation of media content can be performed while bypassing the backbone 312 of the cabin management system 310. In this fashion, the operation of the video display units 320, 330, is decoupled from the cabin management system 310: a request for media content to be presented can be performed with wireless coupling between the personal electronic device 350, the network interface 326, the wireless access point 314, and optionally the remote server 105. In this manner the video display unit 320 can be periodically replaced to keep up with changes in consumer electronics without impacting the ability of the video display unit 320 to communicate with the wireless access point 314 by selecting an appropriate network interface 326. In addition, in some embodiments, the coupling between the wireless access point 314 and the backbone 312 can allow the personal electronic device 350 to be used to control the various systems in the aircraft 100, including the lights 302, the sound systems 224, 234, galley, lavatory, and/or ventilation system functionalities, and the like, via the aforementioned control systems, substantially concurrently with controlling the video display units 320, 330.

In addition, the distributed nature of the video display units 320, 330, can allow for a "primary-secondary" relationship between the video display units 320, 330, in which a primary video display unit (e.g. video display unit 320) substantially controls the operation of a secondary video display unit (e.g. video display unit 330). The primary video display unit can issue commands or instructions to the secondary video display unit. In addition, the primary video display unit can cause media content available to the primary video display unit to be transmitted to the secondary video display unit, for instance via the wireless access point 314. The primary video display unit, in this example the video display unit 320, can be responsible for controlling any number of secondary video display units, as appropriate. In some embodiments, the primary video display unit can effect a "many-to-many" mapping of sources of media content, whether local or remote, to one or more video display units, including the primary video display unit and one or more secondary video display units. Put differently, the primary video display unit can be responsible for redistributing media content to the secondary video display unit(s) via the wireless access point 314.

Figure 3B:
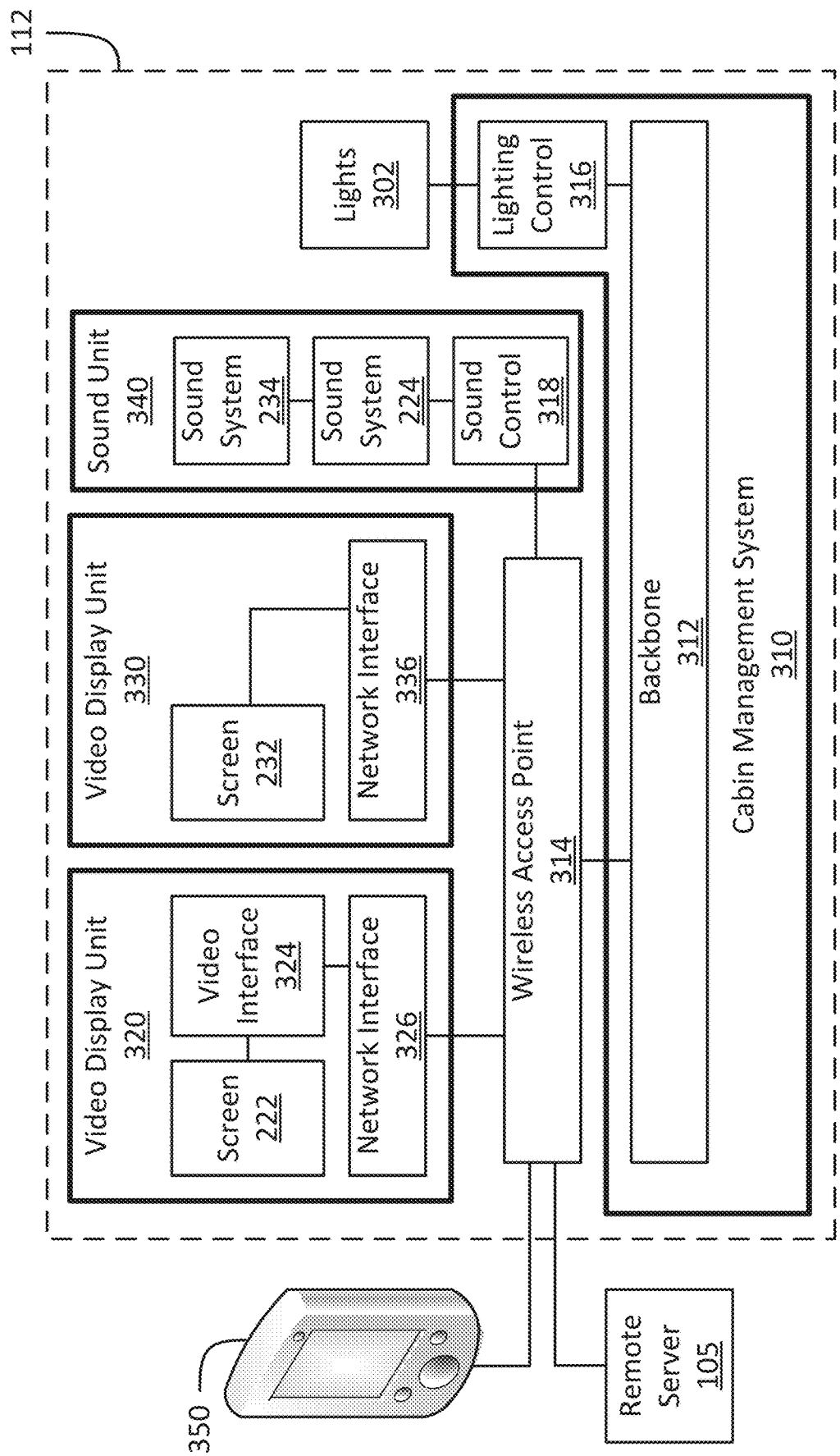

With reference to FIG. 3B, in some embodiments, the sound control 318 is communicatively coupled to the wireless access point 314 and disconnected from the backbone 312, and the sound control 318 can obtain commands from the personal electronic device 350 via the wireless access point 314 to alter parameters of the sound systems 224, 234. Together, the sound systems 224, 234, and the sound control 318 form a sound unit 340 which can be controlled by the personal electronic device 350. Similar modifications can also be performed to other control systems, including the lighting control 316, a ventilation control, galley control, and the like, allowing the personal electronic device 350 to interface with the lights 302 and/or other systems of the cabin 112 via the wireless access point 314.

In some embodiments, the video display units 320, 330 of the cabin are configured for implementing auto-switching functionality. That is to say, when a source of media content becomes available to one of the video display units 320, 330, for example following the source of media content being coupled to the video interface 324, the video interface 324 is configured for causing a request to be sent to the personal electronic device 350, for example via the network interface 326 and the wireless access point 314, to request media display parameters. The personal electronic device 350 can then return media parameters to the wireless access point 314, which can provide the media display parameters, for example in the form of one or more second commands, to the video display unit 320 and/or to the source of media content coupled to the video interface 324.

For instance, if a source of media content (media disk reader, game console, etc.) is connected to the video display unit 320 via an HDMI® cable or other connection interface, the video interface 324 can cause a request for media display parameters to be sent to the personal electronic device 350. The personal electronic device 350 can then provide the media display parameters to the wireless access point 314. In one example, the media display parameters can indicate that the media content produced by the source connected to the video display unit 320 should be displayed on the screen 232 of the video display unit 330. In this example, the wireless access point 314 then issues a second command to the video interface 324 and/or to the source of media content connected thereto to cause the media content produced by the source to be sent to the screen 232 via the network interface 326, the wireless access point 314, the network interface 336, and optionally the video interface 334.

In some embodiments, the personal electronic device 350 is one of a plurality of personal electronic devices, each of which can be configured for controlling presentation of media content via the video display units 320, 330. The personal electronic devices may all be substantially similar to one another, or may be a multiplicity of different devices, including one or more of each of a smartphone, a feature-phone, a tablet, a personal digital assistant, a laptop computer, or any other suitable portable electronic device. In some embodiments, the request sent from the personal electronic device 350 to the wireless access point 320 for presentation of the predetermined media content can include an identifier of the personal electronic device, for instance a MAC address, an IP address, a username, or any other suitable identifier. The wireless access point 320 can use this identifier to later determine to which of the personal electronic devices to query for media presentation parameters. Still other approaches for differentiating amongst multiple personal electronic devices are considered.

Figure 4:
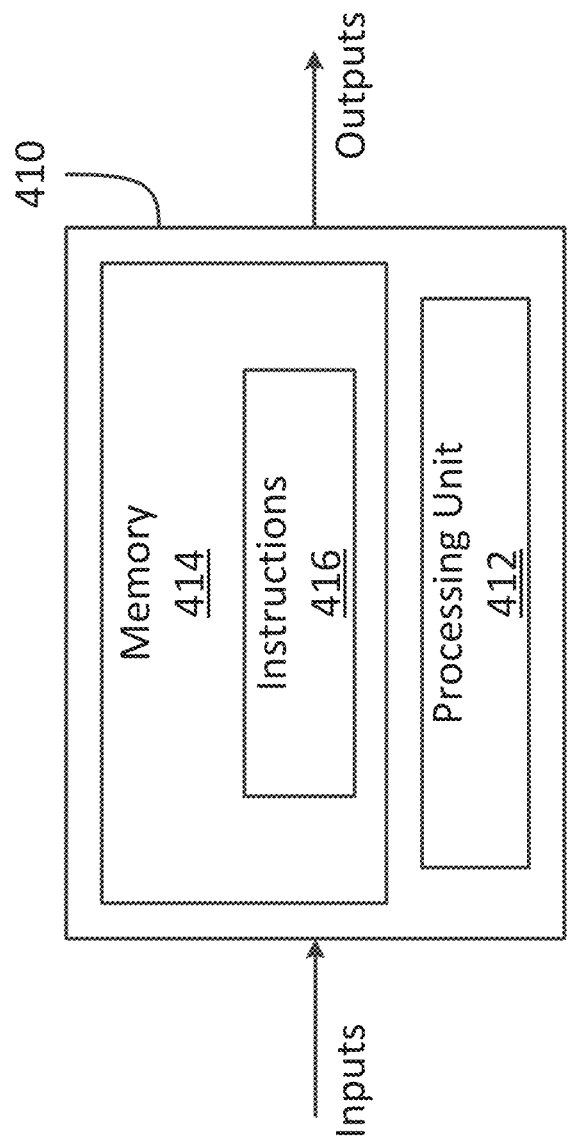
FIG. 4 is a block diagram of an example computing system for implementing one or more elements of FIGS. 3A-B.

With reference to FIG. 4, various components of the cabin 112, including at least part of the cabin management system 310 and at least part of the video display units 320, 330, can be implemented using a computing device 410. The computing device 410 comprises a processing unit 412 and a memory 414 which has stored therein computer-executable instructions 416. The processing unit 412 can comprise any suitable devices configured to cause a series of steps to be performed so as to implement at least part of the cabin management system 310 and/or at least part of the video display units 320, 330. For instance, instructions 416, when executed by the computing device 410 or other programmable apparatus, can cause the functions/acts/steps specified in the present disclosure to be executed. The processing unit 412 can comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 can comprise any suitable known or other machine-readable storage medium. The memory 414 can comprise non-transitory computer readable storage medium including, for example, but not limited to, an electronic, magnetic, optical, electromagnetic, infrared, or semiconductor system, apparatus, or device, or any suitable combination of the foregoing. The memory 414 can include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory 414 can comprise any storage means (e.g., devices) suitable for retrievably storing the computer-executable instructions 416 executable by processing unit 412.

Figure 5:
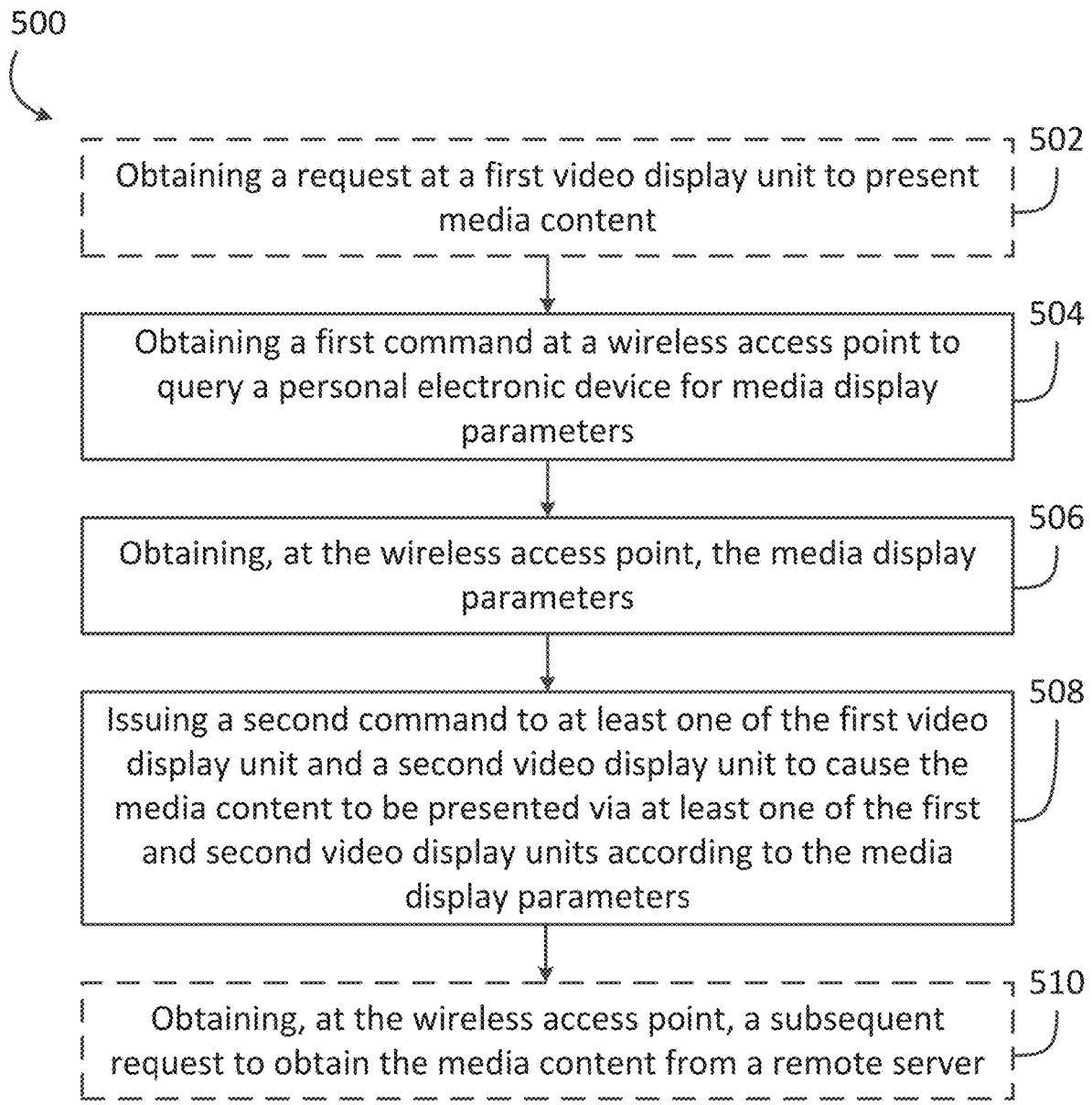
FIG. 5 is a flowchart illustrating an example method for presenting media content in an aircraft.

With reference to FIG. 5, there is provided a method 500 for presenting media content in an aircraft. At step 502, a request is obtained at a video display unit, for example the video display unit 320, to present media content, for example from the personal electronic device 350. The request is transmitted from the personal electronic device 350 to the video display unit through a wireless access point, for example the wireless access point 314. At step 504, a first command to query the personal electronic device 350 for media display parameters is obtained at the wireless access point 314. The first command can be sent from the video display unit 320, which obtained the request from the personal electronic device 350, and can be issued in response to obtention of the request from the personal electronic device 350.

At step 506, the media display parameters are obtained at the wireless access point 314 from the personal electronic device 350. In some embodiments, the first command causes a particular application to be activated on the personal electronic device 350, through which a user of the personal electronic device can specify the media presentation parameters and transmit them to the wireless access point 314. At step 508, a second command can be issued to one or more of the video display unit(s) 320, 330, and/or to the cabin management system 310. The second command sent to the video display units 320, 330 causes the video display unit(s) 320, 330 to present the media content. In some embodiments, the second command sent to the video display unit(s) 320, 330 can include an indication of the media content to be displayed, a location of the media content, instructions regarding the way the media content should be displayed (subtitles, display language, etc.), and the like, for instance based on the media display parameters. The second command, when issued to the cabin management system, can additionally include commands to dim the lights 302 via the light control 316, to cause one of the sound systems 224, 234 to present audio portions of the media content, and the like, and can be transmitted via the backbone 312 and/or via the wireless access point 314.

Optionally, at step 510, the media content can be requested from the wireless access point 314, for example by one of the network interfaces 326, 336, and/or by the backbone 312. For example, the network interface 326 can request that a streaming media content be retrieved by the wireless access point 314 from the remote server 105. In another example, the network interface 336 can request that the wireless access point 314 provide aircraft telemetry data to the remote server 105 so the remote server 105 can construct a live map media content. The remote server 105 can then provide the live map content to the network interface 336 via the wireless access point 314. In some embodiments, the wireless access point 314 is communicatively coupled to a telemetry reporting system onboard the aircraft 100 for acquiring the telemetry data.

In other embodiments, the wireless access point 314 can provide media content to the video display unit(s) 320, 330, and/or to other elements of the cabin management system 310 without a specific request. For example, after the second commands are issued at step 508, the wireless access point 314 can substantially automatically retrieve the media content, for instance from the remote server 105, and provide the media content to the video display unit(s) 320, 330 and/or to the sound systems 224, 234 substantially automatically. In embodiments in which the media content is available via a local media source coupled to the video interface 324, the wireless access point can redistribute the media content to the video display unit 330 and/or to the sound systems 224, 234 in any suitable manner.

Although the foregoing discussion has focused primarily on retrieving media content from a remote server 105, for example over the internet, it should be understood that the aircraft 100 can also have a local media server and/or a local media source which acts as a repository for media content and which can be accessed by the wireless access point 314 to obtain media content therefrom. For example, local media sources such as VHS players, DVD players, Bluray players, video game consoles, digital media players, and the like, can be located within the aircraft and can be coupled to the video display unit 320. In some embodiments, the local media source is coupled to the video display unit 320 via the video interface 324, which can include one or more ports, including coaxial, component, and/or composite connectors, VGA, DVI, HDMI, DisplayPort, and/or MiniDisplay ports, and the like. In some embodiments, the video interface 324 can be substantially content agnostic: the video interface 324 can obtain and decode any suitable type of media content, including copy-protected or encrypted content, to allow the video display unit 320 to redistribute the content throughout the cabin 112, for example to the video display unit 330. In addition, the video interface 324 can be configured for accepting hot-pluggable local media sources, that is to say, media sources which can be coupled to the ports of the video interface 324 at will.

In addition, it should be noted that the various protocols used by the wireless access point 314, the network interfaces 326, 336, and the backbone 312 to communicate can be selected to conform with established digital rights management (DRM) standards for media distribution. This can include various encoding and/or encryption techniques, as appropriate. In some embodiments, the video interface 324 is configured for performing one or more encoding and/or encryption techniques prior to presentation of the media content. For example, the video interface 324 can decode a particular media content from a media source, in accordance with DRM standards, and then re-encode the media content before transmission to the video display unit 330 via the network interface 326 and the wireless access point 314. Still other embodiments are considered.

The methods and systems for presenting media content in an aircraft described herein may be implemented in a high-level procedural or object-oriented programming or scripting language, or a combination thereof, to communicate with or assist in the operation of a computer system, for example the computing device 410. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the at least one processing unit 412 of the computer 410, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems disclosed herein, as well the aircraft itself implementing various aspects of the methods and systems disclosed herein, may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A system for presenting media content in an aircraft, comprising:
    a first video display unit configured for presenting the media content and communicatively coupled to a media source with access to the media content and to a personal electronic device for obtaining therefrom a request to present the media content;
    a sound system comprising a plurality of speakers and controlled by a cabin management system of the aircraft;
    a wireless access point communicatively coupled to the first video display unit for providing the first video display unit with the request and for receiving from the first video display unit a first command to query the personal electronic device for media presentation parameters, wherein the wireless access point is communicatively coupled to the personal electronic device for obtaining the media presentation parameters therefrom, wherein the media presentation parameters comprise an indication of a selected group of the plurality of speakers; and
    a second video display unit configured for presenting the media content and communicatively coupled to the first video display unit via the wireless access point;
    wherein the wireless access point is configured for issuing a second command to the cabin management system to cause the selected group of the plurality of speakers to render the media content, and to at least one of the first video display unit and the second video display unit to cause the media content to be presented via the at least one of the first video display unit and the second video display unit according to the media presentation parameters.

2. The system of claim 1, wherein the second video display unit is one of a plurality of second video display units, wherein the media presentation parameters comprise an indication of a selected second video display unit of the plurality of second video display units, and wherein the wireless access point is configured for issuing the second command to the selected second video display unit to cause the selected second video display unit to present the media content.

3. The system of claim 1, wherein the media source is a remote server communicatively coupled to the first video display unit via the wireless access point, wherein the first video display unit is configured for requesting the media content from the remote server via the wireless access point.

4. The system of claim 3, wherein the second video display unit is configured for presenting the media content responsive to the first video display unit requesting the media content from the remote server.

5. The system of claim 1, wherein the media source is located within the aircraft and wherein the first video display unit being coupled to the media source comprises the media source being connected to a port of the first video display unit.

6. The system of claim 5, wherein causing the media content to be presented via the second video display unit comprises transmitting the media content from the first video display unit to the second video display unit via the wireless access point.

7. The system of claim 1, wherein the first video display unit is configured for issuing the first command to the wireless access point responsive to the first video display unit receiving the request.

8. The system of claim 1, wherein the aircraft comprises a lighting system controlled by a cabin management system of the aircraft, wherein the wireless access point is configured for issuing the second command to the cabin management system to cause the lighting system to adjust a lighting level within the aircraft.

9. A method for presenting media content in an aircraft, comprising:
   obtaining, at a wireless access point within the aircraft, a first command to query a personal electronic device for media presentation parameters, the first command obtained from a first video display unit configured for presenting the media content and coupled to a media source with access to the media content, the first command issued in response to the first video display unit receiving a request to present the media content;
   obtaining, at the wireless access point and from the personal electronic device, the media presentation parameters, wherein the media presentation parameters comprise an indication of a selected group of a plurality of speakers of a sound system of the aircraft, the sound system controlled by a cabin management system of the aircraft; and
   issuing a second command from the wireless access point to the cabin management system to cause the selected group of the plurality of speakers to render the media content, and to at least one of the first video display unit and a second video display unit to cause the media content to be presented via the at least one of the first video display unit and the second video display unit according to the media presentation parameters.

10. The method of claim 9, wherein the second video display unit is one of a plurality of second video display units, wherein the media presentation parameters comprise an indication of a selected second video display unit of the plurality of second video display units, and wherein the second command is issued to the selected second video display unit to cause the selected second video display unit to present the media content.

11. The method of claim 9, further comprising, responsive to the second command being issued to the first video display unit, requesting, via the wireless access point, the media content from a remote server.

12. The method of claim 11, further comprising transmitting the media content to the second video display unit for presenting the media content.

13. The method of claim 9, wherein issuing the second command comprises causing the first video display unit to obtain the media content from the media source, located within the aircraft and connected to a port of the first video display unit.

14. The method of claim 13, wherein causing the media content to be presented via the second video display unit comprises causing the first video display unit to transmit the media content from the first video display unit to the second video display unit via the wireless access point.

15. The method of claim 9, wherein the first video display unit is configured for issuing the first command to the wireless access point responsive to the first video display unit receiving the request.

16. The method of claim 9, further comprising issuing the second command to a cabin management system of the aircraft to cause a lighting system of the aircraft to adjust a lighting level within the aircraft.

* * * * *